VERTICAL DEFLECTION CIRCUIT UTILIZING A SINGLE MULTI-ELECTRODE ELECTRON DISCHARGE DEVICE
Filed Oct. 19, 1964
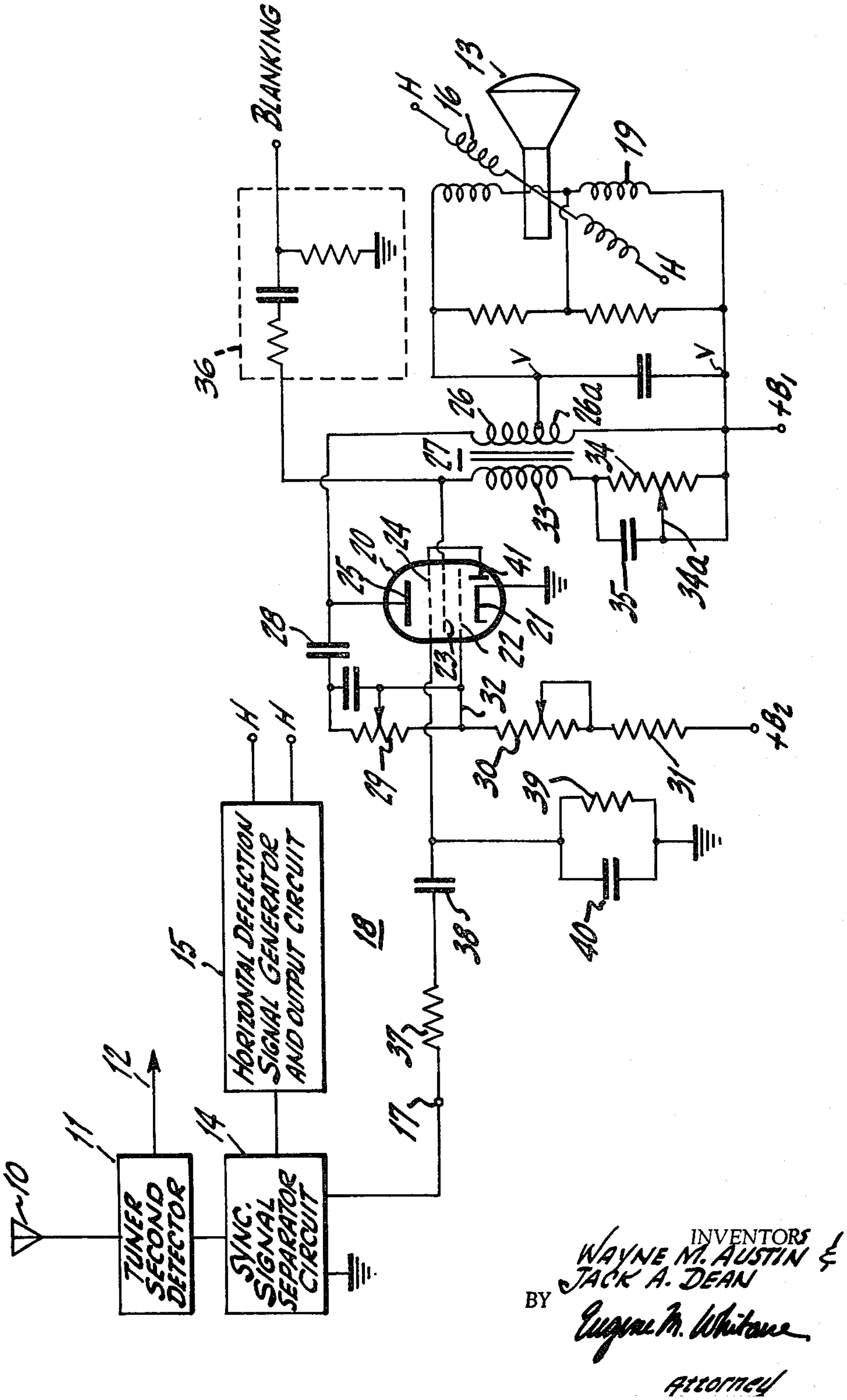
INVENTORS
WAYNE M. AUSTIN &
JACK A. DEAN
BY
Eugene M. Whitacre
Attorney United States Patent Office 3,388,286

Patented June 11, 1968

3,388,286

VERTICAL DEFLECTION CIRCUIT UTILIZING A SINGLE MULTI-ELECTRODE ELECTRON DISCHARGE DEVICE

Wayne M. Austin, Hanover, and Jack Allen Dean, East Brunswick, N.J., assignors to Radio Corporation of America, a corporation of Delaware Filed Oct. 19, 1964, Ser. No. 404,830
7 Claims. (Cl. 315—27)

ABSTRACT OF THE DISCLOSURE

A vertical deflection circuit for a television receiver or similar device utilizing a single pentode electron tube for generating electron beam deflection signals at a sufficiently high current level to drive directly an electromagnetic deflection yoke, wherein said pentode electron tube has a feedback capacitor coupled between the output and input electrodes, additional feedback is provided for coupling, in reversed phase, potential variations produced at said anode to the screen grid and synchronizing signals are supplied to a second control grid.

This invention relates to television receiver circuits and more particularly to a cathode ray beam deflection circuit employing a single, multi-electrode, electron discharge device capable of generating a relatively high level deflection signal output.

Most commercial television receivers employ a deflection circuit which includes separate oscillator and power output stages, the power output stage being required to provide sufficient current to deflect the electron beam produced in the kinescope. The waveform produced by the oscillator stage is synchronized with respect to received composite television signals by applying to the oscillator synchronizing signals derived from the composite television signal.

In the interests of economy, as well as reliability and performance, it is desirable to reduce the number of electron tubes (or equivalent devices) and associated components required to produce electron beam deflection signals while maintaining the same power output as is obtained with conventional multi-tube deflection circuits.

Furthermore, it is desirable to provide a deflection circuit employing a single electron discharge device wherein synchronizing signals may be applied to such device while substantially no deflection waveform components are fed back into the synchronizing signal generating circuits.

In accordance with the present invention, a deflection circuit for use in a television receiver comprises a single, multi-element electron discharge device for generating electron beam deflection signals at a sufficiently high current level to drive directly an electromagnetic deflection yoke. The windings of the deflection yoke are transformer coupled to the anode of the electron discharge device. First and second feedback paths are provided from the anode to grid elements intermediate the cathode and anode so as to produce self-oscillations of a desired waveform in the deflection circuit. The self-oscillations of the circuit are synchronized with the synchronizing signal component of a received composite television signal by applying such synchronizing signal component to a further grid element intermediate the anode and cathode of the discharge device.

The invention may be understood further when the following detailed description is read in connection with the accompanying single figure drawing which shows a schematic electrical circuit diagram, partially in block form, of a television receiver including a vertical deflection circuit embodying the invention.

The television receiver illustrated in the drawing includes an antenna 10 for intercepting and supplying composite television signals to a tuner-second detector 11. Tuner-second detector 11 normally includes a radio frequency amplifier, a frequency converter for converting radio frequency signals to intermediate frequency signals, an intermediate frequency amplifier, a detector for deriving composite video signals from intermediate frequency signals, and a video amplifier. An amplified composite video television signal is derived at an output terminal 12 and is applied, for example, to the control grid (not shown) of a television kinescope 13. The composite video television signal is also applied to a synchronizing signal separator circuit 14, the latter being connected to the output of tuner-second detector 11. Synchronizing signal separator circuit 14 supplies horizontal synchronizing pulses to a horizontal deflection signal generator and output circuit 15. Horizontal deflection circuit 15 includes a pair of output terminals H—H which are connected to the similarly labelled terminals of a horizontal deflection winding 16 associated with kinescope 13.

Vertical synchronizing pulses derived from synchronizing signal separator circuit 14 are applied to an input terminal 17 of a vertical deflection circuit 18 embodying the invention in a manner to be explained hereinafter. Vertical deflection signals are produced at the output terminals V—V of vertical deflection circuit 18 and are applied to the terminals V—V of a vertical deflection winding 19 associated with kinescope 13.

Vertical deflection circuit 18 includes a pentode electron tube 20, having a cathode 21, a first control grid 22, a screen grid 23, a second control grid 24 and an anode 25. Anode 25 is coupled to a first positive potential supply $+B_1$ by means of the primary winding 26 of an output transformer 27, a portion **26*a* of the primary winding of output transformer 27** being coupled in autotransformer fashion to the output terminals V—V.

In order to provide self-oscillations in the circuit, first and second feedback paths are provided from anode 25 to first control grid 22 and to screen grid 23, respectively. The first feedback path includes a coupling capacitor 28 connected between anode 25 and one end of a linearity potentiometer 29, with the other end of potentiometer 29 being connected by means of a height control potentiometer 30 and a fixed resistor 31 to a second source of positive potential $+B_2$. The second source of positive potential $+B_2$ typically may be the common "B boost" supply provided in present commercial television receivers. The feedback path to first control grid 22 is completed by means of an electrical conductor 32 (or resistor if required) coupled between grid 22 and the junction of linearity potentiometer 29 and height control potentiometer 30.

The feedback path to screen grid 23 (i.e., the second feedback path) includes an additional winding 33 associated with transformer 27, one end of winding 33 being coupled to screen grid 23 and the other end thereof being coupled by means of a frequency control or "hold" potentiometer 34 to positive potential supply $+B_1$. Winding 33 is phased with respect to winding 26 such that an increase in potential at anode 25 produces a decrease in potential at screen grid 23. A by-pass capacitor 35 is coupled between the wiper **34*a* of potentiometer 34 and the end of potentiometer 34 which is coupled to winding 33. Blanking signals for the kinescope 13 may be derived, for example, by means of a network 36 coupled to screen grid 23.**

Negative synchronizing pulses are applied from synchronizing signal separator circuit 14 to second control grid 24 by means of a coupling network comprising series-connected resistor 37 and capacitor 38. A biasing network comprising parallel-connected resistor 39 and capacitor 40 is coupled between second control grid 24 and a source of reference potential such as chassis ground. A diode 41, arranged to limit positive voltage excursions of second control grid 24 with respect to cathode 21 is coupled between grid 24 and cathode 21. The diode 41 may be an external two element device or, preferably, the diode may be incorporated in pentode tube 20 in the manner described in the co-pending application of Thomas M. De Muro, Ser. No. 311,474, now U.S. Patent No. 3,263,108 entitled "Electron Discharge Tube" and assigned to the same assignee as the present invention.

The operation of the apparatus will now be described as it occurs during one complete electron beam deflection cycle, the cycle comprising a relatively long duration, linear trace portion and a relatively short duration retrace portion. At the commencement of the trace portion of a beam deflection cycle, capacitor 28 is charged to a potential such that first control grid 22 is at a potential sufficiently negative to cut off space current flow in pentode 20. Anode 25 and screen grid 23 are therefore initially at substantially $+B_1$ potential while second control grid 24 and cathode 21 are at ground potential. Capacitor 28 begins to discharge through the relatively long time-constant circuit (i.e., long compared to trace interval) which includes linearity potentiometer 29, height control potentiometer 30 and resistor 31. As capacitor 28 discharges, the potential of first control grid 22 rises above cutoff in an approximately linear manner and current begins to flow in pentode 20. The potential of screen grid 23 drops rapidly to its nominal operating level as screen current charges capacitor 35. Current of substantially parabolic waveform flows to anode 25 and the potential of anode 25 drops in a substantially linear manner as a result of the potential produced across transformer winding 26 by the flow of anode current therein. As the potential of anode 25 falls, a resulting increasing potential is applied to screen grid 23 by means of winding 33 of transformer 27. Near the end of the trace portion of the deflection cycle, the rising screen grid potential, rising first control grid potential, and decreasing anode potential cause the pentode 20 to operate in the vicinity of the "knee" of the anode current-anode voltage characteristics. Thereafter, any further change in the same direction of the enumerated potentials would cause a rapid increase in screen grid current, a decrease in screen grid potential as a result of the increased voltage drop in frequency control potentiometer 34, a decrease in anode current and, as a result, a rapid increase in anode potential. Finally, through the feedback action of winding 33 a further substantial decrease in screen grid potential would be produced. As a result of the above-described feedback operation, in conjunction with the operation of the first feedback path to first control grid 22 (which will be explained more fully below), pentode 20 rapidly would be driven into a cutoff condition. However, in order to avoid any non-linearity in the end of the trace waveform and in order to synchronize the operation of the circuit of pentode 20 with the operation of the remainder of the television receiver, negative polarity vertical synchronizing pulses are applied from synchronizing signal separator circuit 14 to second control grid 24 via input terminal 17. The negative synchronizing pulses drive second control grid 24 to a negative potential, thereby decreasing the flow of current to anode 25 and increasing the flow of current to screen grid 23. The feedback operation of winding 33 described above takes place and the potential of anode 25 rises rapidly. The rapid positive change in potential of anode 25 is coupled via capacitor 28 to first control grid 22, causing a substantial increase in current flow to control grid 22. Capacitor 28 is rapidly charged by the grid current so as to drive control grid 22 in a negative sense towards cutoff potential. The cumulative effect of the action of the first and second feedback paths drives pentode 20 to cutoff in a relatively short time (i.e., short with respect to the trace interval). The rapid change in current through the inductive load (i.e., transformer 27 and deflection windings 19) coupled to anode 25 causes the potential of anode 25 to rise to a value several times greater than the potential $+B_1$ before returing to $+B_1$. This high positive potential spike of flyback pulse constitutes the retrace portion of the deflection cycle. At the end of retrace, the potential on capacitor 28 has reached a level sufficient to hold first control grid 22 below cutoff as the potentials on anode 25 and screen grid 23 return to their nominal design values. Capacitor 28 then commences to discharge and the deflection cycle is repeated. It should be noted that as anode 25 rose to a substantial positive potential during retrace, screen grid 23 dropped to a relatively large negative potential so as to insure that no space current flows to anode 25 during retrace.

In accordance with one aspect of the present invention, synchronizing signals are coupled to an element of pentode tube 20 at which there are created substantially no deflection waveform components, i.e., second control grid 24. Therefore, deflection waveform components are not, as in prior devices, fed back into the synchronizing signal circuits.

What is claimed is:

1. In a television receiver, an electron beam deflection circuit comprising:
  an electron discharge device having an anode, a cathode and at least first, second and third electrodes disposed between said cathode and said anode in the named order,
  an output circuit coupled to said anode,
  synchronizing signal supply means coupled to said third electrode for decreasing space current flow to said anode upon the occurrence of periodic synchronizing signals,
  first feedback means coupled between said anode and said first electrode for coupling a proportionate amount of electrical variations produced at said anode to said first electrode,
  second feedback means coupled between said anode and said second electrode for coupling, in reversed phase, electrical variations produced at said anode to said second electrode whereby potential increases at said anode are regeneratively coupled to both said first and second electrodes so as to rapidly drive said discharge device into a cut-off condition during the retrace portion of each deflection cycle, said deflection circuit further comprising
    circuit means coupled to said first electrode for producing, subsequent to production of said cut-off condition, a potential at said first electrode which increases in a positive sense and thereby causes space current flow in said discharge device to increase throughout the trace portion of each deflection cycle.

2. In a television receiver, an electron beam deflection circuit comprising:
  an electron discharge device having an anode, a cathode and at least first, second and third electrodes disposed between said cathode and said anode in the named order,
  an output circuit coupled to said anode,
  synchronizing signal supply means coupled to said third electrode for decreasing space current flow to said anode at the commencement of the retrace portion of each deflection cycle,
  first feedback means coupled between said anode and said first electrode for coupling a proportionate amount of electrical variations produced at said anode to said first electrode,
  second feedback means coupled between said anode and said second electrode for coupling, in reversed phase, electrical variations produced at said anode to said second electrode, said first and second feedback means regeneratively coupling potential increases produced at said anode to said first and second electrodes respectively, so as to rapidly drive said discharge device to a cut-off condition during the retrace portion of each deflection cycle, said deflection circuit further comprising circuit means coupled to said first electrode for producing, subsequent to production of said cut-off condition, a potential at said first electrode which increases in a positive sense throughout the trace portion of each deflection cycle and thereby causes space current flow in said discharge device to increase throughout such trace portion.

3. In a television receiver, an electron beam deflection circuit comprising:

an electron discharge device having an anode, a cathode and at least first, second and third electrodes disposed between said cathode and said anode in the named order, an electron beam deflection winding coupled to said anode, synchronizing signal supply means coupled to said third electrode for decreasing space current flow to said anode upon the occurrence of periodic synchronizing signals, first feedback means coupled between said anode and said first electrode for coupling potential variations produced at said anode to said first electrode, second feedback means coupled between said anode and said second electrode for coupling in reversed phase, potential variations produced at said anode to said second electrode, said first and second feedback means regeneratively coupling potential increases produced at said anode to said first and second electrodes, respectively, so as to rapidly decrease the flow of space current in said discharge device to zero during the retrace portion of each deflection cycle, said deflection circuit further comprising circuit means coupled to said first electrode and to said first feedback means for producing, subsequent to said space current being decreased to zero, a gradually positively increasing potential at said first electrode thereby causing space current flow in said discharge device to increase throughout the trace portion of each deflection cycle.

4. In a television receiver, an electron beam deflection circuit comprising:

an electron discharge device having an anode and a cathode and further having a first control grid, a screen grid and a second control grid disposed in the named order between said cathode and said anode, an electron beam deflection winding coupled to said anode, synchronizing signal supply means coupled to said second control grid for decreasing space current flow to said anode and for increasing space current flow to said screen grid at the commencement of the retrace portion of each deflection cycle, capacitive feedback means coupled between said anode and said first control grid for coupling electrical potential variations produced at said anode to said first control grid, inductive feedback means coupled between said anode and said screen grid for coupling, in reversed phase, potential variations produced at said anode to said screen grid, said capacitive and inductive feedback means regeneratively coupling potential increases produced at said anode to said first control grid and screen grid, respectively, so as to rapidly decrease the flow of space current in said discharge device to zero during the retrace portion of each deflection cycle, said deflection circuit further comprising circuit means coupled to said first control grid and to said capacitive feedback means for producing, subsequent to said space current decreasing to zero, a potential at said first control grid which increases positively and thereby causes space current flow in said discharge device to increase throughout the trace portion of each deflection cycle.

5. In a television receiver, an electron beam deflection circuit comprising:

an electron discharge device having an anode and a cathode and further having a first control grid, a screen grid and a second control grid disposed in the named order between said cathode and said anode, an output transformer having a primary winding coupled to said anode, said transformer further having a pair of output terminals and a feedback winding, said feedback winding being coupled to said screen grid and being phased with respect to said primary winding such that an increase in potential at said anode produces a decrease in potential at said screen grid, said deflection circuit further comprising a capacitor coupled between said anode and said first control grid for coupling potential variations produced at said anode to said first control grid, whereby potential increases at said anode are regeneratively coupled to both said screen grid and to said first control grid so as to rapidly drive said discharge device into a cut-off condition during the retrace portion of each deflection cycle, said deflection circuit further comprising charging circuit means comprising a source of potential and a charging resistor coupled to said capacitor for producing an increasing potential at said first control grid subsequent to initiation of the retrace portion of each deflection cycle such that space current flow in said discharge device increases throughout the trace portion of each deflection cycle, and means coupled to said second control grid for applying thereto periodic negative polarity synchronizing signals to decrease space current flow to said anode and thereby initiate the retrace portion of each deflection cycle.

6. In a television receiver, an electron beam deflection circuit comprising:

an electron discharge device having an anode and a cathode and further having a first control grid, a screen grid and a second control grid disposed in the named order between said cathode and anode, an output transformer coupled to said anode, means coupled to said second control grid for applying thereto negative polarity, periodic synchronizing signals to decrease space current flow to said anode and to increase space current flow to said screen grid at the commencement of the retrace portion of each deflection cycle, first feedback means coupled between said anode and said first control grid for coupling electrical potential variations produced at said anode to said first control grid, second feedback means including at least a portion of said output transformer coupled between said anode and said screen grid for coupling, in reversed phase, potential variations produced at said anode to said screen grid, means coupled in series with a resistance for supplying a positive potential to said screen grid, circuit means coupled to said first control grid and to said first feedback means for gradually increasing the potential of said first control grid with respect to said cathode from a value sufficiently negative to prevent flow of space current in said discharge device to a value sufficiently positive to cause a rapid increase in current flow to said screen grid, said first and second feedback means regeneratively coupling potential increases produced at said anode to said first control grid and to said screen grid respectively, so as to rapidly decrease the flow of space current in said discharge device to zero during the retrace portion of each deflection cycle and said circuit means providing a control potential at said first control grid so as to produce a substantially linearly increasing potential variation in said output transformer during the trace portion of each deflection cycle.

7. In a television receiver, an electron beam deflection circuit comprising:

an electron discharge device having an anode and a cathode and further having a first control grid, a screen grid and a second control grid disposed in the named order between said cathode and said anode, an electron beam deflection winding, a transformer coupled to said anode for inductively coupling said anode to said deflection winding, means coupled to said second control grid for applying thereto negative polarity, periodic synchronizing signals to decrease space current flow to said anode and to increase space current flow to said screen grid at the commencement of the retrace portion of each deflection cycle, capacitive feedback means coupled between said anode and said first control grid for coupling electrical potential variations produced at said anode to said first control grid, inductive feedback means including at least a portion of said transformer coupled between said anode and said screen grid for coupling, in reversed phase, potential variations produced at said anode to said screen grid, said inductive feedback means regeneratively coupling potential increases produced at said anode to said screen grid so as to rapidly decrease the flow of space current to said anode to zero during the beginning of the retrace portion of each deflection cycle, said capacitive feedback means regeneratively coupling potential increases produced at said anode to said first control grid so as to decrease the flow of all space current in said discharge device to zero by the end of the retrace portion of each deflection cycle, said deflection circuit further comprising circuit means coupled to said first control grid and to said capacitive feedback means for producing, subsequent to all space current decreasing to zero, a gradually increasing potential at said first control grid such that space current flow to said anode increases throughout the trace portion of each deflection cycle.

References Cited

UNITED STATES PATENTS

| | | | |
|---|---|---|---|
| 2,284,337 | 5/1942 | Mulert et al. | 250—36 |
| 2,482,150 | 9/1949 | Bocciarelli | 315—27 |
| 3,196,309 | 7/1965 | Chi-Sheng Liu | 315—27 |
| 3,263,108 | 7/1966 | De Muro | 313—3 |
| 3,287,596 | 11/1966 | Rhodes et al. | 315—27 |

FOREIGN PATENTS

| | | |
|---|---|---|
| 643,993 | 10/1950 | Great Britain. |

ROBERT L. GRIFFIN, *Primary Examiner.*

JOHN W. CALDWELL, *Examiner.*

R. BLUM, *Assistant Examiner.*